United States Patent [19]

Sekiguchi

[11] Patent Number: 5,126,548
[45] Date of Patent: Jun. 30, 1992

[54] IC CARD WITH ADDITIONAL TERMINALS AND METHOD OF CONTROLLING THE IC CARD

[75] Inventor: Kouji Sekiguchi, Kawasaki, Japan

[73] Assignee: Kabushiki Kaisha Toshiba, Kawasaki, Japan

[21] Appl. No.: 554,344

[22] Filed: Jul. 19, 1990

[30] Foreign Application Priority Data

Jul. 19, 1989 [JP] Japan .................................. 1-184546

[51] Int. Cl.⁵ ............................................. G06K 19/06
[52] U.S. Cl. ..................................... 235/492; 235/380; 235/487
[58] Field of Search .................... 235/380, 487, 492; 361/395; 439/137, 140, 68

[56] References Cited

U.S. PATENT DOCUMENTS

| 4,780,603 | 10/1988 | Hamada | 235/492 |
| 4,810,864 | 3/1989 | Takahashi | 235/380 |
| 4,896,028 | 1/1990 | Kushima | 235/492 |

FOREIGN PATENT DOCUMENTS

| 167044 | 1/1986 | European Pat. Off. |
| 233649 | 8/1987 | European Pat. Off. |
| 257648 | 3/1988 | European Pat. Off. |
| 296414 | 12/1988 | European Pat. Off. |
| 302530 | 2/1989 | European Pat. Off. |
| 62-117263 | 5/1987 | Japan |
| 63-125396 | 5/1988 | Japan |
| 63-155574 | 6/1988 | Japan |

Primary Examiner—Harold Pitts
Attorney, Agent, or Firm—Foley & Lardner

[57] ABSTRACT

An IC card has additional connection terminals adjacent to existing conventional connection terminals. Corresponding additional terminals are arranged in a terminal unit. When the additional terminals of both the IC card and terminal unit are not used, the additional terminals are put under an input mode or a floating mode. Only when the additional terminals are used, they are switched to an input/output mode, under which data are communicated between the IC card and the terminal unit through the additional terminals.

6 Claims, 6 Drawing Sheets $C_1$ : VCC
$C_2$ : RST
$C_3$ : CLK
$C_4$ : RFU
$C_5$ : GND
$C_6$ : VPP
$C_7$ : I/O
$C_8$ : RFU

IC CARD WITH ADDITIONAL TERMINALS AND METHOD OF CONTROLLING THE IC CARD

BACKGROUND OF THE INVENTION

1. Field of the Invention

The present invention relates to an IC card with additional terminals and a method of controlling the IC card.

2. Description of the Prior Art

Conventional connection terminals disposed in an IC card are based on ISO/DIS7816/2 standards. The connection terminals are eight in total and consist of power source terminals (Vcc and GND), a reference clock terminal (CLK), a reset signal terminal (RST), a data communication terminal (I/O), a power source terminal (Vpp) for writing data into a nonvolatile memory disposed inside the IC card, and two reserved terminals (RFUs). The reserved terminals (RFUs) are presently not used, and therefore, the remaining six terminals are used to connect the IC card to a terminal unit.

FIG. 1 is a view of a conventional IC card 1, and FIG. 2 is a view of the dimensions and positions of eight connection terminals C1 to C8 of the IC card 1. The connection terminals C1 to C8 are packaged in an IC module 2 in the IC card 1. The terminal C1 is a power source terminal (Vcc), C2 a reset signal terminal (RST), C3 a reference clock terminal (CLK), C4 a reserved terminal (RFU), C5 a power source terminal (GND), C6 a power source terminal (Vpp) for writing data into a nonvolatile memory, C7 a data communication terminal (I/O), and C8 another reserved terminal (RFU).

The connection terminals of the conventional IC card may be formed in various shapes as shown in FIG. 3.

The conventional IC card according to the ISO/DIS standards has only these eight connection terminals in total including the reserved terminal RFU (C8) that is presently not used and the single data communication terminal C7 (I/O). The data communication carried out through the data communication terminal C7 is of a start-stop synchronization type which is very slow in communication speed. For example, the conventional IC card takes several seconds to several minutes to start the data communication after it is inserted into a terminal unit. The use of only one data communication terminal not only delays the start of data communication but also hinders sufficient performance of CPU functions of the IC card.

SUMMARY OF THE INVENTION

To solve the above problems, an object of the present invention is to provide an IC card with additional terminals that can improve a data transfer rate and fully utilize CPU functions of the IC card, and a method of controlling the IC card.

In order to accomplish the object, an IC card according to the present invention arranges additional connection terminals adjacent to existing conventional connection terminals. Also, corresponding additional terminals are arranged in a terminal unit. When the additional terminals of the IC card and terminal unit are not used, they are put under an input mode or a floating mode. Only when the additional terminals are used, they are switched to an input/output mode in response to control signals.

Namely, according to the present invention, an IC card is provided with additional terminals in addition to existing conventional connection terminals, and a terminal unit is also provided with additional terminals. These additional terminals are controlled by control signals. The IC card of the present invention can be used just like conventional IC cards, depending on whether or not the control signals exist.

These and other objects, features and advantages of the present invention will be more apparent from the following detailed description of preferred embodiments in conjunction with the accompanying drawings.

DETAILED DESCRIPTION OF THE EMBODIMENTS

Figure 4:
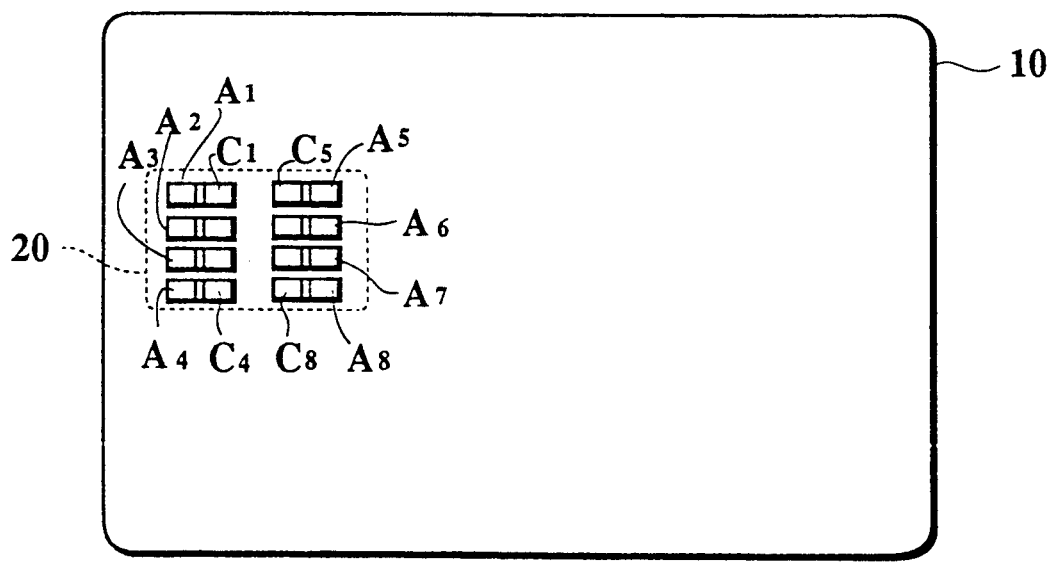
FIG. 4 is a schematic view showing connection terminals of an IC card according to an embodiment of the present invention.

FIG. 4 is a view showing an IC card 10 according to the present invention. The IC card 10 has an embedded IC module 20. The size of the IC module 20 is the same as that of the conventional IC card 2 of FIG. 1. Connection terminals C1 to C8 arranged in the IC module 20 have also the same dimensions as those of the conventional connection terminals of FIG. 2. According to the present invention, the IC card 10 has additional connection terminals A1 to A8 disposed adjacent to the terminals C1 to C8 in back to back relations. Wiring between the terminals C1 to C8 and the additional terminals A1 to A8 in the IC module 20 will be explained later.

Figure 5:
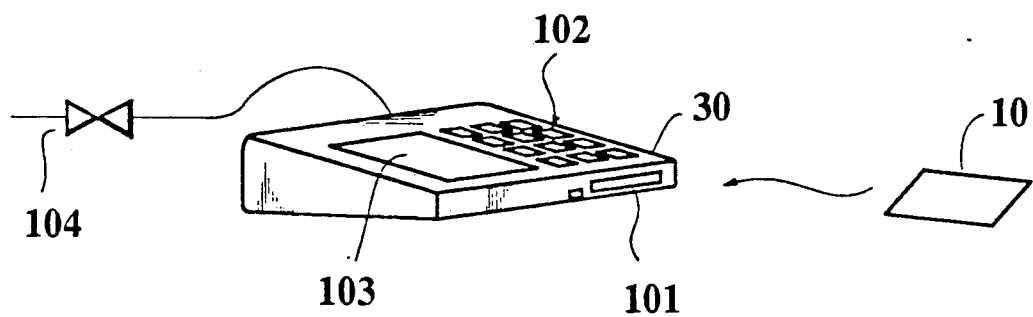
FIG. 5 is a view of a terminal unit that accepts either of the connectional IC card or the IC card of the present invention.

FIG. 5 shows a terminal unit 30 having an insertion slit 101 into which the IC card 10 of the present invention is inserted. When the IC card 10 is inserted into the terminal unit 30, the connection terminals of the IC card 10 are connected to connection terminals of the terminal unit 30, respectively. Thereafter, data are transferred between the IC card 10 and the terminal unit 30 through operations of keys 102 arranged on the terminal unit 30. Results of the data transfer and key operations are displayed on a display 103 of the terminal unit 30.

The terminal unit 30 may be connected to a large computer or another terminal device through a communication line 104.

Figure 6:
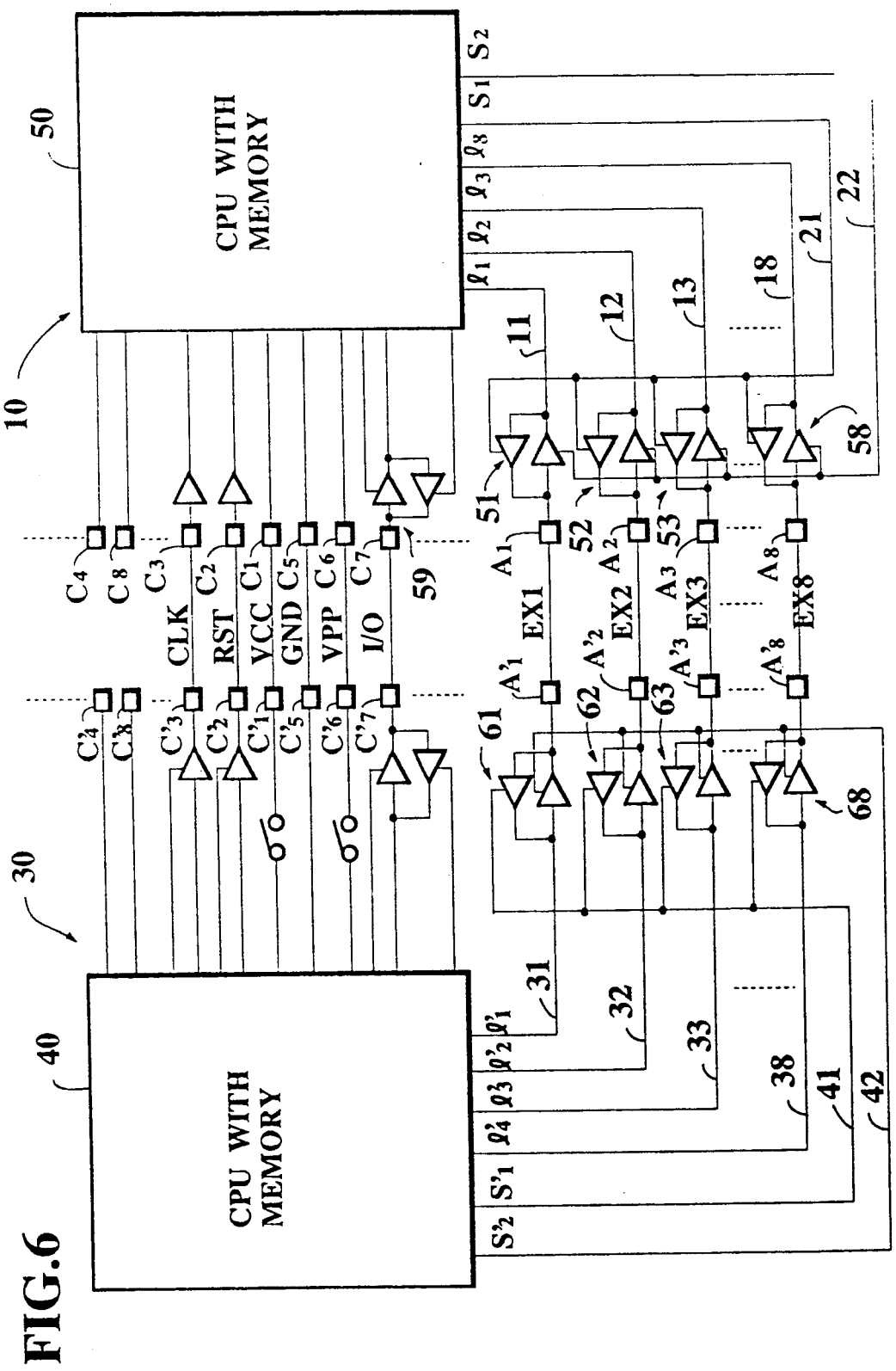
FIG. 6 is a circuit diagram showing the IC card and terminal unit according to the present invention.

FIG. 6 is a view showing the wiring of the IC card 10 of FIG. 4 and the terminal unit 30 of FIG. 5. The right half of FIG. 6 shows the IC card 10 involving a CPU with memory 50, the conventional connection terminals C1 to C8 and additional terminals A1 to A8. And the left half of FIG. 6 shows the terminal unit 30 involving a CPU with memory 40, conventional terminals C1' to C8' and additional terminals A1' to A8'.

When the IC card 10 is inserted into the terminal unit 30, the terminals C1 to C3 and C5 to C7 are connected to the terminals C1' to C3' and C5' to C7', respectively. At the same time, the additional terminals A1 to A8 of the IC card 10 are connected to the additional terminals A1' to A8' of the terminal unit 30, respectively.

In the IC card 10, the additional terminals A1 to A8 are connected to the CPU with memory 50 through signal lines 11 to 18. The signal lines 11 to 18 have mode switching circuits 51 to 58, respectively. The CPU with memory 50 provides control signals to the mode switching circuits 51 to 58 through control lines 21 and 22, thereby switching an input mode, an output mode, an input/output mode and a floating mode from one to another.

When the control line 22 provides a control signal S2 and the control 21 does not provide a control signal S1, the mode switching circuits 51 to 58 are switched to the input mode which allows data to flow only from the additional terminals A1 to A8 to the CPU with memory 50.

When the control line 21 provides the control signal S1 and the control line 22 does not provide the control signal S2, the mode switching circuits 51 to 58 are switched to the output mode which allows data to flow only from the CPU with memory 50 to the additional terminals A1 to A8.

When the control lines 21 and 22 provide the control signals S1 and S2, respectively, the mode switching circuits 51 to 58 are switched to the input/output mode which allows data to flow between the CPU with memory 50 and the additional terminals A1 to A8.

When the control lines 21 and 22 do not provide the control signals S1 and S2, the mode switching circuits 51 to 58 are switched to the floating mode which does not allow data to flow between the CPU with memory 50 and the additional terminals A1 to A8.

This embodiment also has a mode switching circuit 59 identical to the other mode switching circuits, between the connection terminal C7 (I/O) and the CPU with memory 50.

In the terminal unit 30, the additional terminals A1' to A8' are connected to the CPU with memory 40 through connection lines 31 to 38. The connection lines 31 to 38 have mode switching circuits 61 to 68, respectively, which are the same as those of the IC card 10. Operations of the mode switching circuits 61 to 68 of the terminal unit 30 are similar to those of the IC card 10 so that their explanations will be omitted.

Figure 7:
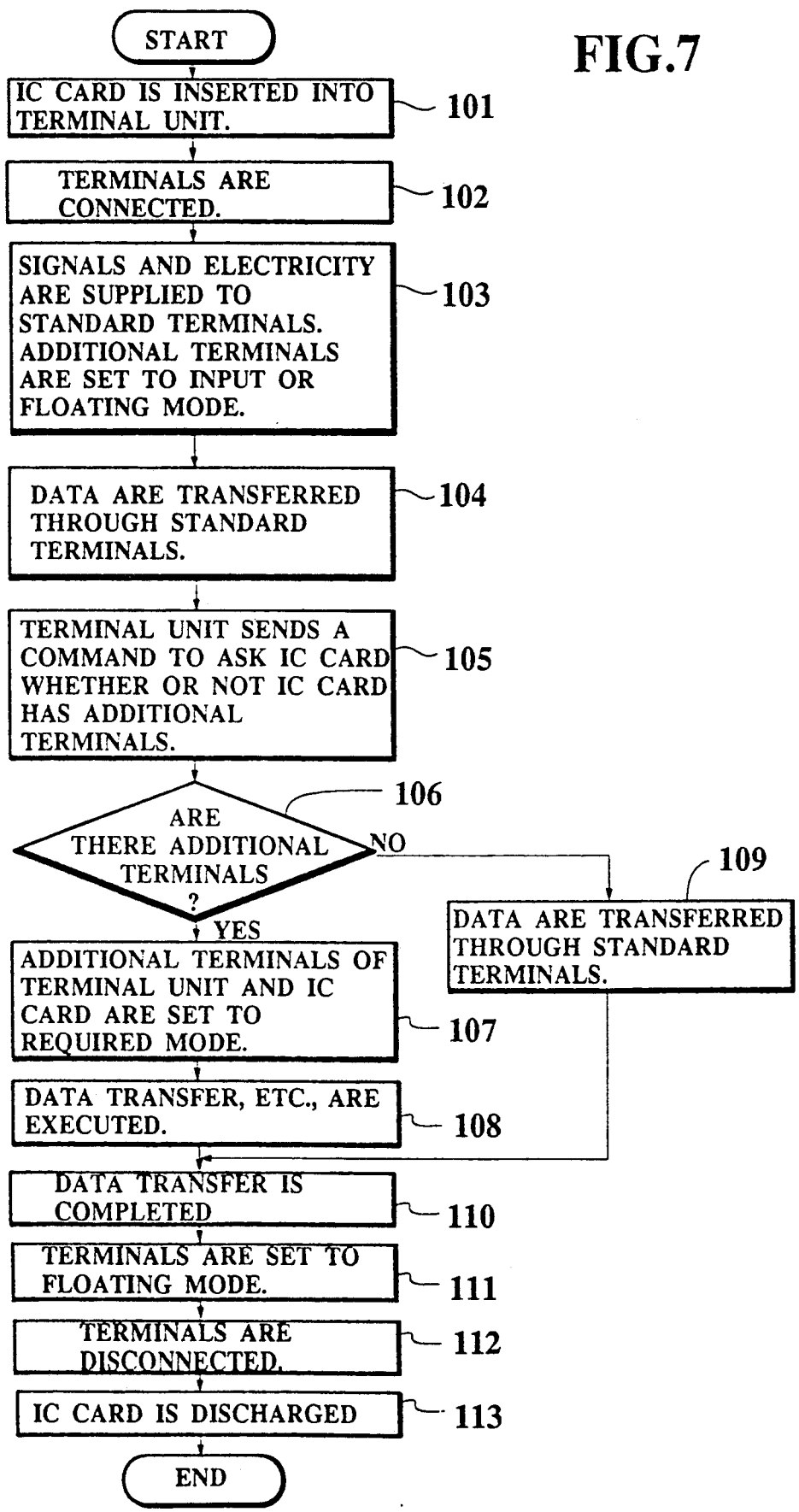
FIG. 7 is a flowchart showing a program for controlling the IC card of the present invention.

FIG. 7 is a flowchart showing a program for controlling an IC card. The program controls an insertion of the conventional IC card 1 of FIG. 1 into the terminal 30 as well as an insertion of the IC card 10 of the present invention into the terminal unit 30.

In step 101, the IC card 10 is inserted into the terminal unit 30.

In step 102, the connection terminals of the terminal unit 30 and IC card 10 are connected to one another.

In step 103, irrespective of the conventional IC card 1 or the IC card 10 of the present invention, the additional terminals A1' to A8' and A1 to A8 of the terminal unit 30 and IC card 10 are set to the input mode or the floating mode. Namely, when the IC card 10 of the present invention is inserted into the terminal unit 30, the CPU with memory 50 of the IC card 10 sets the mode switching circuits 51 to 58 to the input mode or the floating mode. At the same time, the CPU with memory 40 of the terminal unit 30 sets the mode switching circuits 61 to 68 to the input mode or the floating mode.

Figure 1:
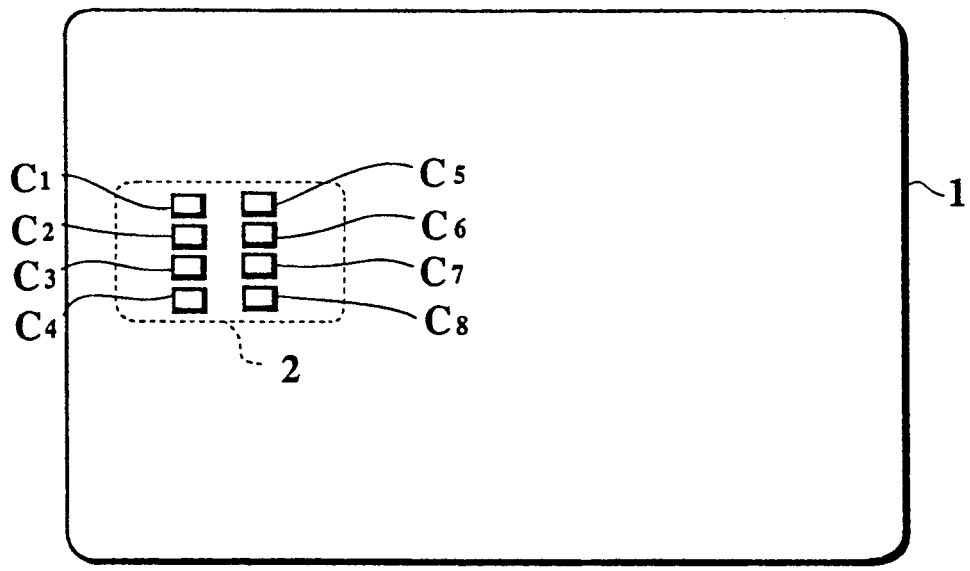
FIG. 1 is a view showing an arrangement of connection terminals of an IC card according to the prior art.
Figure 2:
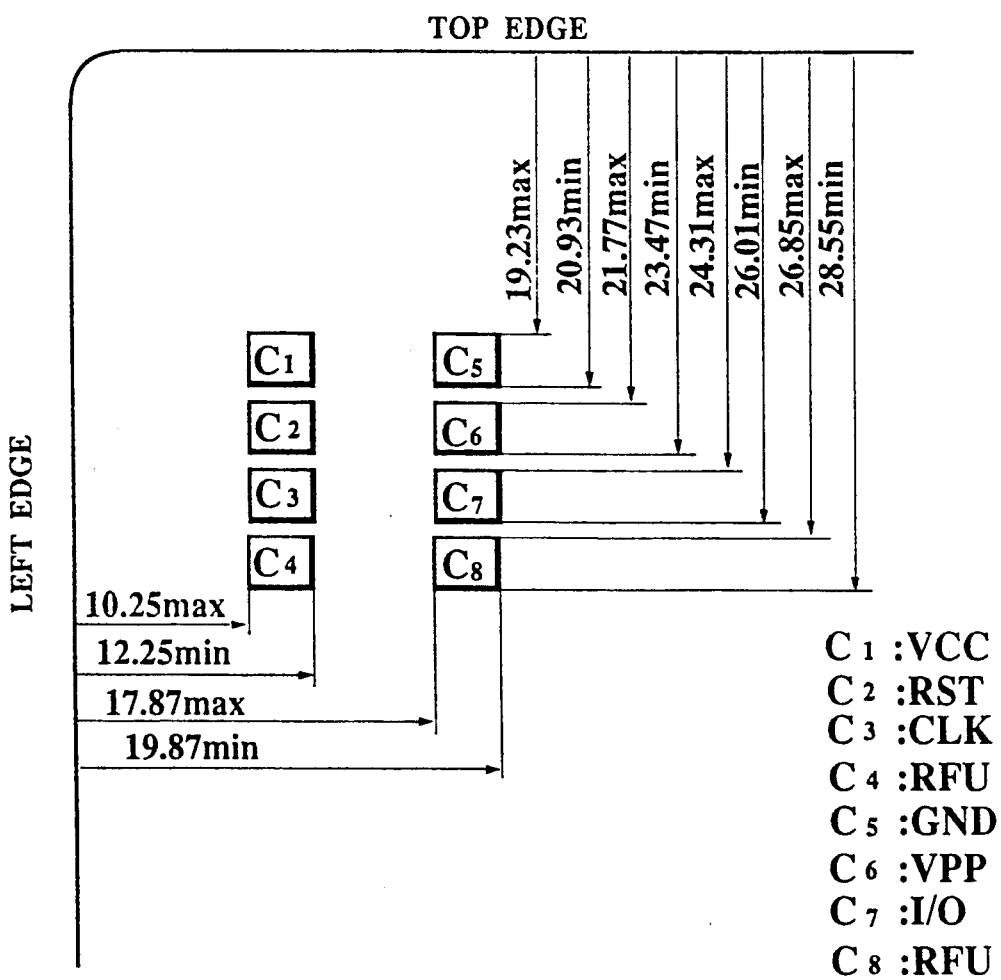
FIG. 2 is a view showing the dimensions of the connection terminals of the IC card of FIG. 1.
Figure 3:
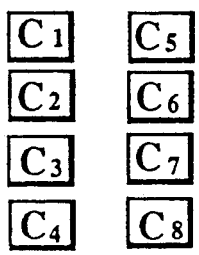
FIG. 3 is a view showing the shapes of conventional connection terminals.
Figure 3:
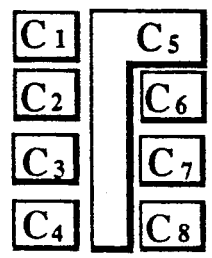
Figure 3:
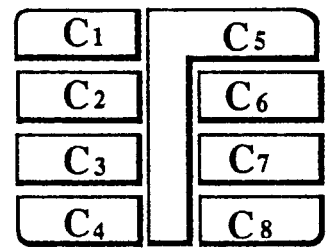
Figure 3:
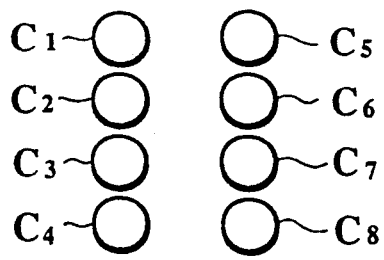
Figure 3:
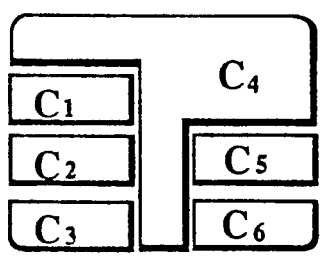

If the conventional IC card 1 shown in FIG. 1 is inserted into the terminal unit 30, the CPU with memory 40 of the terminal unit 30 also sets the mode switching circuits 61 to 68 to the input mode or the floating mode.

In step 104, data are transferred between the IC card and the terminal unit through the ISO standard connection terminals C1 to C8 (actually, fewer terminals are used for the data transfer, as described before).

In step 105, the CPU with memory 40 of the terminal unit 30 sends, through the connection terminals C7' and C7, a command asking the inserted IC card whether or not the IC card has additional terminals in addition to the ISO standard connection terminals C1 to C8.

In step 106, it is checked to see whether or not the IC card sends a signal indicating the existence of the additional terminals A1 to A8 through the connection terminals C7 and C7' and the additional terminals A1 to A8 exist.

If the signal indicating the existence of the additional terminals A1 to A8 is sent from the IC card to the terminal unit 30, the CPU with memory 40 of the terminal unit 30 and the CPU with memory 50 of the IC card 10 send the control signals S1', S2', S1 and S2 to the mode switching circuits 61 to 68 and 51 to 58 to establish the input/output mode in step 107. Then, data are transferred through the additional terminals A1 to A8 and A1' to A8' in step 108.

If the signal indicating the existence of the additional terminals A1 to A8 is not sent from the IC card to the terminal unit 30 or the signal indicating no existence of the additional terminals A1 to A8 is sent from the IC card to the terminal unit 30 in step 106, the data are transferred only through the ISO standard connection terminals C1 to C8 in step 109.

In step 110, the data transfer started in step 108 or 109 is completed.

In step 111, the connection terminals C7 and C7' are set to the floating mode.

In step 112, all of the connection terminals are disconnected.

In step 113, the IC card is discharged from the terminal unit 30.

Although the embodiment uses the additional terminals for transferring data, it is possible to use the additional terminals for transferring clock signals and synchronization signals.

Figure 8:
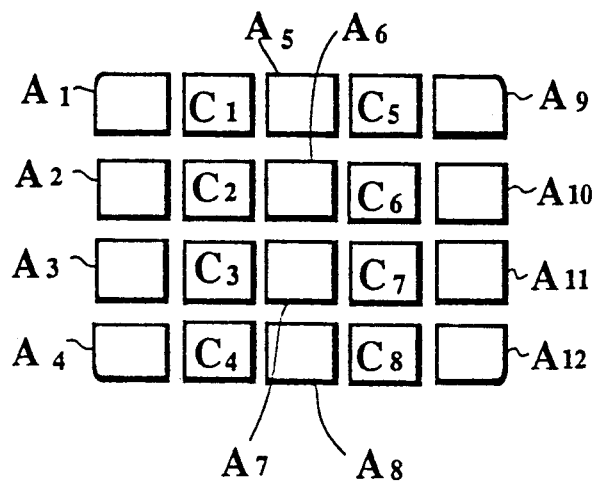
FIG. 8 is a view showing modifications of the present invention.
Figure 8:
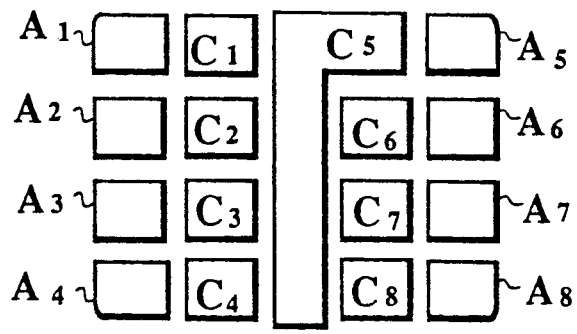

An arrangement of the additional terminals is not limited to the disclosed one but may be realized in various forms as shown in FIG. 8.

The control signals S1', S2', S1 and S2 can be controlled by the CPU of the terminal unit 30 or by the CPU of the IC card 10 of the present invention. In the above embodiment, the number of the additional terminals is eight for the sake of simplicity. This number may optionally be increased or decreased.

The additional terminals according to the present invention may easily be added to existing connection terminals of an IC card. Since the additional terminals are set to the input mode or the floating mode at first, the IC card with the additional terminals of the present invention can be used just like a conventional IC card with no problem.

These additional terminals can be controlled by an existing CPU of a terminal unit and by an existing CPU of the IC card. The additional terminals realizes a high-speed data transfer and efficient use of the CPUs of the terminal unit and IC card.

Various modifications will become possible for those skilled in the art after receiving the teachings of the present disclosure without departing from the scope thereof.

What is claimed is:

1. An IC card having a plurality of connection terminals formed at predetermined positions in the IC card, comprising:
   (a) a plurality of additional terminals corresponding to the connection terminals, the additional terminals disposed adjacent to the connection terminals in back to back relationship;
   (b) a CPU with a memory for controlling data communication between the IC card and the outside of the IC card through said connection terminals and said additional terminals; and
   (c) mode switching means disposed between said additional terminals and the CPU with memory and switched to, according to control signals provided by the CPU with memory, an input mode for allowing data to flow only from said additional terminals to the CPU with a memory, an output mode for allowing data to flow only form the CPU with memory to said additional terminals, and a floating mode for not allowing data to flow between the CPU with memory and said additional terminals, said mode switching means being switched to one of the input mode and the floating mode when no data communication is carried out through said additional terminals.

2. The IC card as claimed in claim 1, further comprising:
   a CPU with memory for controlling data communication carried out between the IC card and the outside of the IC card through the connection terminals and said additional terminals.

3. The IC card as claimed in claim 2, further comprising:
   mode switching means disposed between said additional terminals and the CPU with memory and switched to, according to control signals provided by the CPU with memory, one of an input mode for allowing data to flow only from said additional terminals to the CPU with memory, an output mode for allowing data to flow only from the CPU with memory to said additional terminals, an input/output mode for allowing data to flow between the CPU with memory and said additional terminals, and a floating mode for not allowing data to flow between the CPU with memory and said additional terminals.

4. An IC card comprising:
   (a) a plurality of connection terminals formed at predetermined positions in the IC card;
   (b) a plurality of additional terminals corresponding to said connection terminals, disposed adjacent to said connection terminals in back to back relationship;
   (c) a CPU with memory for controlling data communication carried out between the IC card and the outside of the IC card through said connection terminals and additional terminals; and
   (d) mode switching means disposed between said additional terminals and said CPU with memory and switched to, according to control signals provided by said CPU with memory, one of an input mode for allowing data to flow only from said additional terminals to said CPU with memory, an output mode for allowing data to flow only from said CPU with memory to said additional terminals, an input/output mode for allowing data to flow between said CPU with memory and said additional terminals, and a floating mode for not allowing data to flow between said CPU with memory and said additional terminals.

5. The IC card as claimed in claim 4, wherein said mode switching means are switched to one of the input mode and floating mode when no data communication is carried out through said additional terminals.

6. A method of controlling an IC card having a plurality of connection terminals formed at predetermined positions in the IC card, a plurality of additional terminals corresponding to the connection terminals and disposed adjacent to the connection terminals in back to back relationship and a CPU with memory for controlling data communication carried out between the IC card and an external terminal unit through the connection terminals and additional terminals, comprising:
   (a) a step of establishing one of an input mode for allowing data to flow only from the additional terminals to the CPU with memory and a floating mode not allowing data to flow between the CPU with memory and the additional terminals;
   (b) a step of sending a command from the terminal unit to the CPU with memory of the IC card to test whether or not the IC card has the additional terminals;
   (c) a step of establishing an input/output mode for allowing data to flow between the CPU with memory and the additional terminals when a signal indicating that the IC card has the additional terminals is sent from the CPU with memory of the IC card to the terminal unit; and
   (d) a step of communicating data between the IC card and the terminal unit through the additional terminals.

* * * * *